United States Patent Office 3,100,509
Patented Aug. 13, 1963

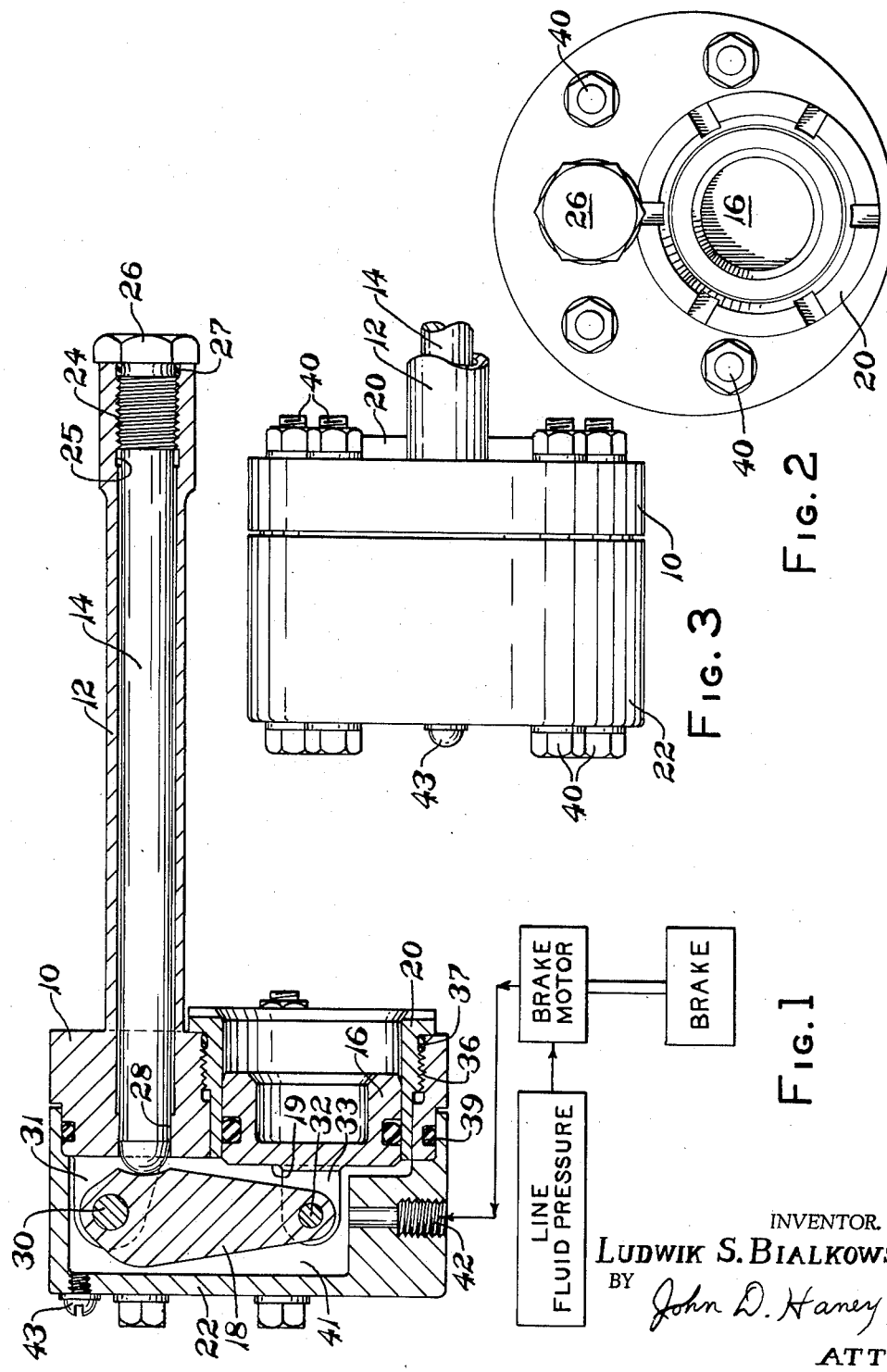

3,100,509
ACCUMULATOR FOR FLUID POWER SYSTEMS
Ludwik Seweryn Bialkowski, Troy, Ohio, assignor to The B. F. Goodrich Company, New York, N.Y., a corporation of New York
Filed Mar. 30, 1962, Ser. No. 183,794
4 Claims. (Cl. 138—31)

This invention relates to fluid power systems such as hydraulic brake actuating systems. More particularly, the invention relates to regulating such systems to compensate for pressure variations in the system fluid caused by thermal expansion of the fluid. The invention is useful for any fluid power system in which the working fluid undergoes extreme temperature changes, and is especially useful for high energy brake hydraulic systems which normally operate under these conditions.

Thermal expansion of the operating fluid of a fluid power system causes objectionable pressure variations in the system fluid and erratic operation of the mechanisms operated by the system. An example of this effect is commonly observed in hydraulic systems for aircraft brakes in which the portion of the fluid in the brake motor may undergo temperature changes in the order of 200° F. or more in the brief intervals in which the brakes are engaged during a landing. The braking pressure of the hydraulic system is normally modulated by the aircraft operator. As a result of the volumetric expansion of the fluid, however, the brake operating characteristics will vary erratically with the temperature of the fluid, and this imposes a serious burden on the aircraft operator.

According to this invention, pressure variations resulting from thermal expansion of the fluid are compensated for by adjusting the volume of the system available to the fluid commensurately with the temperature of the fluid. Therefore, notwithstanding radical temperature changes in the fluid, the brake operating characteristics are more nearly uniform throughout a given period of operation. The preferred mechanism for accomplishing this function is adapted to continuously adjust the volume of the fluid system commensurately with its temperature regardless of the cause of the temperature change. The mechanism, moreover, is entirely mechanical and requires no external power sources. It is adequately sensitive and highly dependable in that it is highly resistant to damage from shock loads and vibrations, and may be made small enough for mounting directly on a brake or be part of a brake.

A typical mechanism includes a body or housing including a chamber for receiving the operating fluid of the system. In a wall portion of the chamber a member such as a simple piston is supported for movement into and out of the chamber to vary the volume of fluid in the chamber. The position of the piston is controlled by temperature sensitive elements which expand or contract with the temperature of the fluid in the chamber.

A compensating mechanism for a hydraulic brake system is shown in the accompanying drawing as one example of how this invention may be practiced.

In the drawings:

FIG. 1 shows a longitudinal cross section of the compensating mechanism;

FIG. 2 shows a right end view as the mechanism appears in FIG. 1; and

FIG. 3 shows a top or plan view as the mechanism appears in FIG. 1.

Referring to FIG. 1, the mechanism has a body 10 with a long tubular casing 12 integral with the body in which a compensating rod 14 is housed. A piston 16 in the body is pivotally connected to the body by a lever 18. The piston is mounted in a sleeve 20 threaded into the body. The lever 18 and the pressure face 19 of the piston are enclosed by a hollow cover cap 22 engaged with the body 10.

The rod 14 is not fastened anywhere to the casing 12 except at the right end of the rod as it is seen in FIG. 1. At this right end, the rod has a thread 24 which tightly engages a threaded socket 25 at the outer extremity of casing 12. To assemble the mechanism, the rod 14 is slipped into casing 12 through socket 25 and thread 24 tightened in the socket by turning the rod through an integral hexagonal head 26 adjoining thread 24. Head 26 seals against a gasket 27.

The front or left end of the rod is supported loosely on an annular shoulder 28 inside body 10. The front tip of the rod projects slightly beyond body 10 and abuts lever 18 firmly. Although in the example shown the rod 14 and casing 12 are straight, these parts could be made in any shape required to fit conveniently with a brake. In particular, these parts may be curved.

Lever 18 is pivoted on pin 30 fixed to lugs 31 on body 10. The opposite end of lever 18 is pivoted by pin 32 to lugs 33 on piston 16.

Piston sleeve 20 is externally threaded at 36 and is screwed tightly into body 10 against a sealing gasket 37.

Cover cap 22 is sealed in pressure tight engagement with body 10 by a gasket 39 and a set of bolts 40 (see FIGS. 2 and 3). The chamber 41 defined inside cap 22 has a port 42 through which hydraulic fluid from the hydraulic system (and preferably directly from the brake motor) is communicated. When installed in a hyraulic brake system, chamber 41 is entirely filled with fluid from the system through a suitable pipe (shown only schematically) to port 42 from the brake motor. Moreover, since the left end of rod 14 is loosely supported by shoulder 28, the interior of casing 12 forms an extension of chamber 41 and is also filled with the system fluid. Accordingly, rod 14 and the interior of casing 12 together with the other parts are at times bathed in the system fluid and therefore rapidly reach the same temperature as the system fluid when the fluid temperature changes. The pressure of the fluid in the system acts against piston 16 to keep lever 18 biased against the end of rod 14 projecting through shoulder 28. Cap 22 includes a bleeder screw 43 to assist in filling the chamber 41 with hydraulic fluid.

This mechanism operates to perform its compensating function by differential linear expansion of the casing 12 relative to rod 14. Body 10 and its casing 12 are made of a material with a much higher thermal coefficient of linear expansion than the rod 14. For example, body 10 and casing 12 may be made of aluminum or magnesium, whereas rod 14 is preferably a nickel-steel composition in which the nickel content is in the order of 35% by weight. A nickel-steel alloy of this class and known commercially an "Invar" may be used advantageously because this alloy has a coefficient of linear expansion of substantially zero, for temperatures ranging from about 0 degrees Fahrenheit up to around 300 degrees Fahrenheit and a very low coefficient even beyond these ranges.

When there is an appreciable change in temperature of the hydraulic fluid in the system (which ordinarily occurs when the brake is engaged for a prolonged period), the hydraulic fluid tends to expand in volume and therefore increase the system pressure. Since casing 12 is exposed directly to the fluid, the casing is quickly heated to the same temperature and therefore expands lengthwise proportional to the temperature increase. The rod 14, however, does not elongate any significant amount even though it is also raised to the same temperature. Since the rod 14 is anchored by threads 24 and 25 to casing 12, the elongation of the casing displaces rod 14 lengthwise away from the lever 18 in FIG. 1. The pressure of the fluid in chamber 41 acts on the piston 16 to displace the piston rightward, swing lever 18 counterclockwise on pin 30 and keeping the lever engaged with the end of rod 14. The displacement of the piston 16 under these conditions increases the volume of chamber 41 to accommodate the expanded volume of the system fluid and thus relieve any increase in the fluid pressure by reason of the thermal expansion of fluid, thus maintaining a substantially constant pressure in the brake motor. The mechanism operates to continuously displace the piston 16 as the temperature and volume of the fluid increase. When and as the system fluid cools to ambient temperatures, piston 16 is displaced in the opposite direction by the reverse thrust of rod 14 against lever 18 caused by the thermal contraction of casing 12.

The term "expansion" with reference to the fluid and the thermal sensitive parts such as the casing 12 and rod 14 is to be understood in the positive as well as negative sense.

The actual differential change in length between rod 14 and casing 12 resulting from thermal expansion is very small, and the main purpose of the lever 18 is to compound the magnitude of this change and move the piston 16 by an amount which is effective to accomplish the desired change in volume of the fluid. The designer of this mechanism has wide latitude in selecting the proper geometry of the mechanism parts to accomplish the function desired in any particular system. Any means for transmitting the differential displacement of the compensating rod and casing to the volume control piston may be used in lieu of the lever 18.

What is claimed is:

1. Mechanism for regulating fluid power systems to compensate for pressure variations in the system fluid caused by thermal expansion of the fluid, said mechanism comprising a body having a tubular casing projecting from the body, a compensating rod in said casing, said rod being fastened to a portion of the casing remote from the body and said rod being of a material which has a coefficient of linear expansion different from that of the material of said tubular casing, a chamber in the body open to said casing, means for communicating operating fluid of a fluid power system into said chamber and into said casing so that said fluid contacts said rod, a movable member mounted in said body for movement into and out of said chamber to vary the volume of fluid within said chamber, and a lever in said chamber pivotally connected to said movable volume-varying member and also pivotally connected to said body and engageable with said rod, said lever being movable pivotally in response to a relative lengthwise displacement of said rod in said casing commensurately with a temperature change of said fluid communicated to said rod to effect a corresponding displacement of said movable member and thereby minimize pressure variations of said fluid resulting from thermal expansion of said fluid.

2. The mechanism of claim 1 wherein said rod engages said lever at a location closer to the body pivot of said lever than to said pivot of the lever with said movable member.

3. Mechanism for regulating fluid power systems to compensate for pressure variations caused by thermal expansion of the fluid, said mechanism comprising a body having a tubular casing projecting from the body, a compensating rod in the casing, said rod being narrower than said casing and fastened to the casing only at a portion of the casing remote from the body, said rod being of a material which has a coefficient of linear expansion appreciably lower than the coefficient of linear expansion of the material of said casing, a chamber in the body open to said casing, means for communicating operating fluid of a fluid power system into said chamber and into said casing so that such fluid surrounds said rod in said casing, said rod projecting into said chamber from said casing and being supported in said body for lengthwise displacement into and out of said chamber as said casing contracts and expands relative to said rod by temperature changes of said fluid, a movable member mounted in said body for movement into and out of said chamber to vary the volume of said chamber, and means in said chamber for transmitting a relative lengthwise displacement of said rod in said casing to said movable member to effect a corresponding displacement of the latter and thereby minimize pressure variations of said fluid resulting from thermal expansion of said fluid.

4. The mechanism of claim 3 wherein said means for transmitting the lengthwise displacement of said rod to said movable member is a lever in said chamber pivotally connected to said movable member and to said body, said movable member being biased by said fluid pressure communicated to said chamber to a position in said body in which said lever is engaged with said rod.

References Cited in the file of this patent

UNITED STATES PATENTS

| | | |
|---|---|---|
| 1,637,693 | Galloway | Aug. 2, 1927 |
| 1,837,213 | Galloway | Dec. 22, 1931 |
| 2,324,217 | Krauth | July 13, 1943 |
| 2,353,692 | Cunningham | July 18, 1944 |